Figure 6:
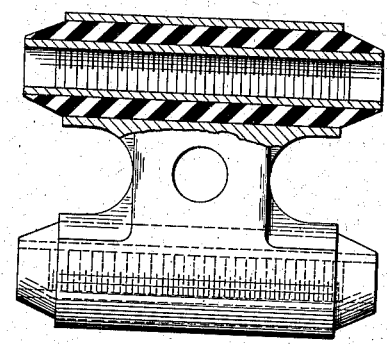

June 21, 1938.  S. GLUHAREFF  2,121,429
RESILIENT ENGINE MOUNT
Filed May 21, 1935  3 Sheets-Sheet 1
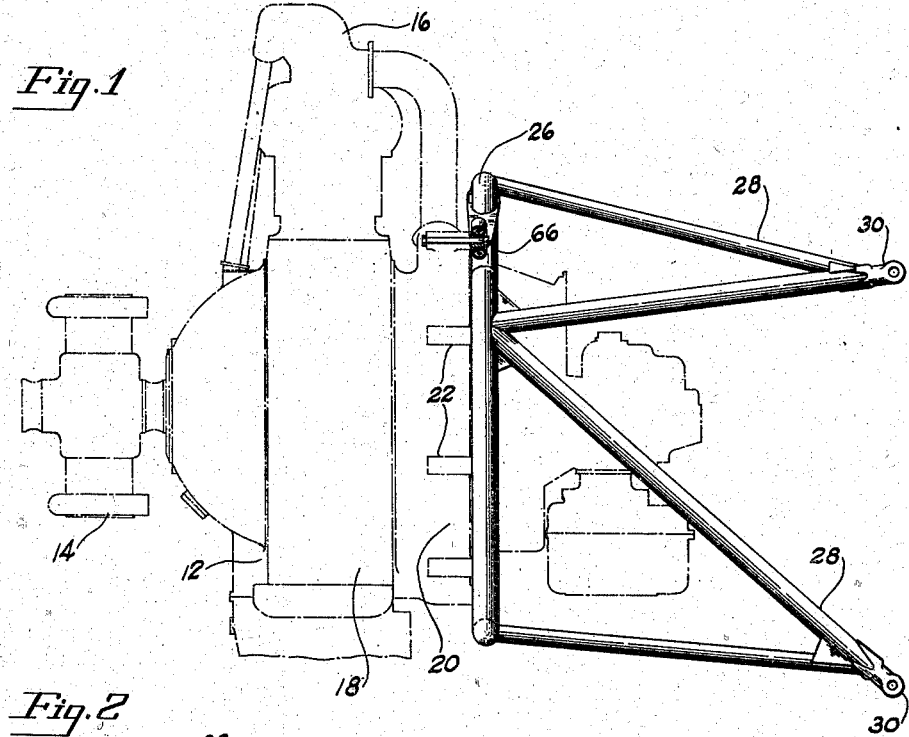
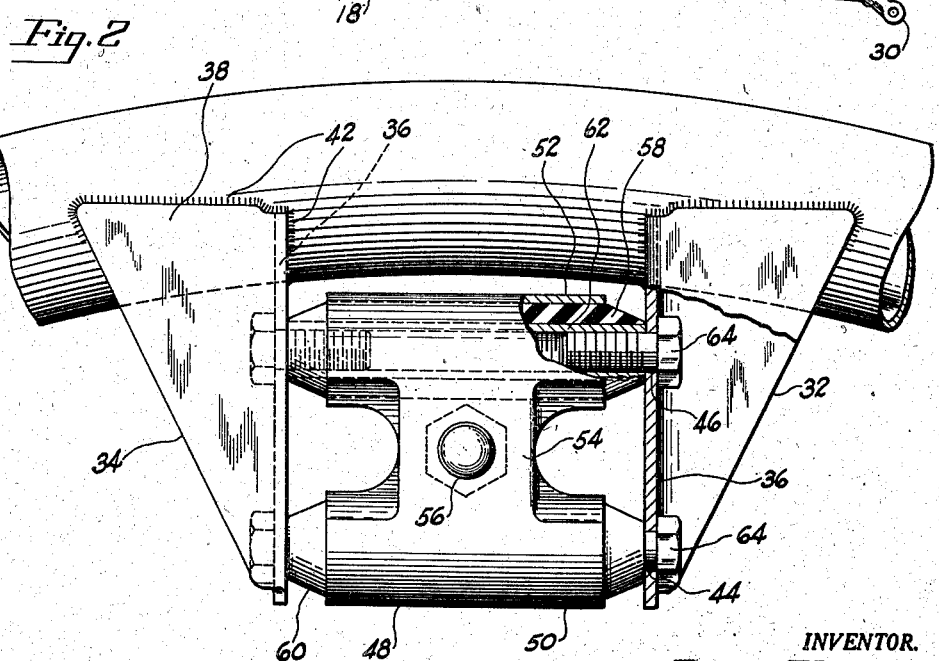
INVENTOR.
Serge Gluhareff
BY Harris G. Luther
ATTORNEY

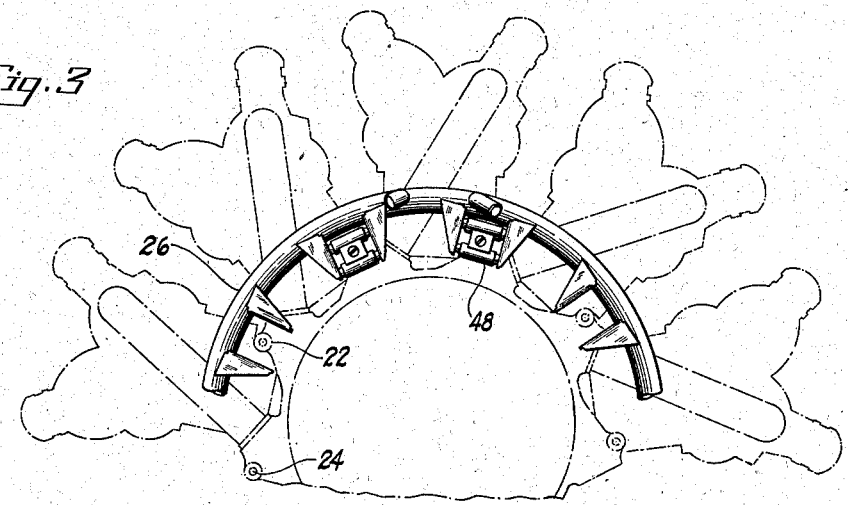
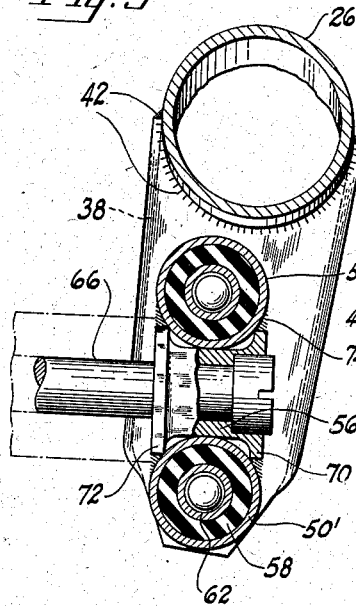
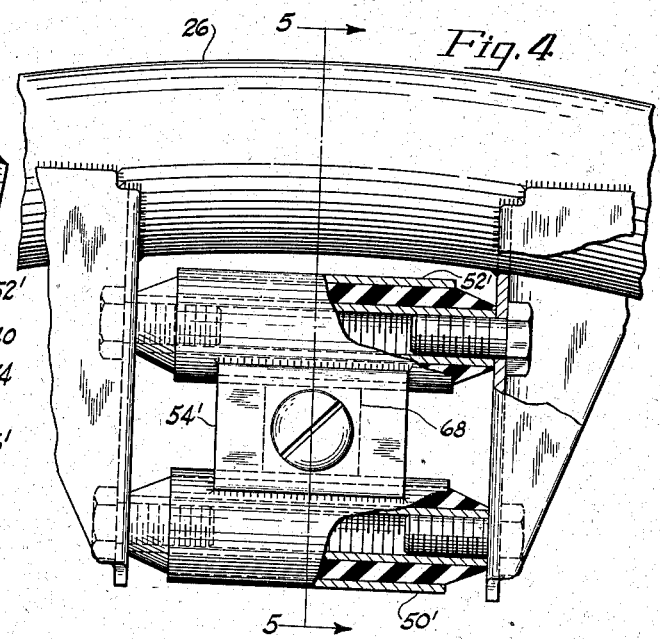

June 21, 1938.

S. GLUHAREFF 2,121,429

RESILIENT ENGINE MOUNT

Filed May 21, 1935

3 Sheets-Sheet 3

INVENTOR.
Serge Gluhareff
BY Harris G. Luther
ATTORNEY

Patented June 21, 1938

2,121,429

UNITED STATES PATENT OFFICE 2,121,429

RESILIENT ENGINE MOUNT

Serge Gluhareff, Stratford, Conn., assignor, by mesne assignments, to United Aircraft Corporation, a corporation of Delaware Application May 21, 1935, Serial No. 22,507

9 Claims. (Cl. 248—5)

This invention relates to improvements in resilient engine mounts and particularly to improvements in resilient mountings for supporting an engine upon the frame of a vehicle such as an aircraft, and has for an object the provision of a flexible mounting that will safely secure the engine to the supporting structure of the vehicle frame and at the same time act as a dampener to reduce the amount of vibration transmitted from the engine to the frame. A further object resides in the provision of a resilient engine mounting by means of which the engine may be conveniently and quickly attached to and detached from the engine supporting structure.

Other objects and advantages will appear as the description proceeds.

In the accompanying drawings in which like reference numerals are used to designate similar parts throughout, I have illustrated a suitable mechanical embodiment of what is now considered to be the preferred form of the invention and two slightly modified forms thereof. The drawings, however, are for the purpose of illustration only and are not to be taken as limiting the invention, the scope of which is to be measured entirely by the scope of the appended claims.

Figure 7:
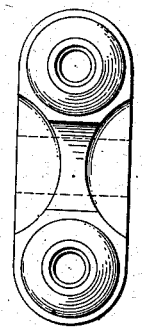
Figure 8:
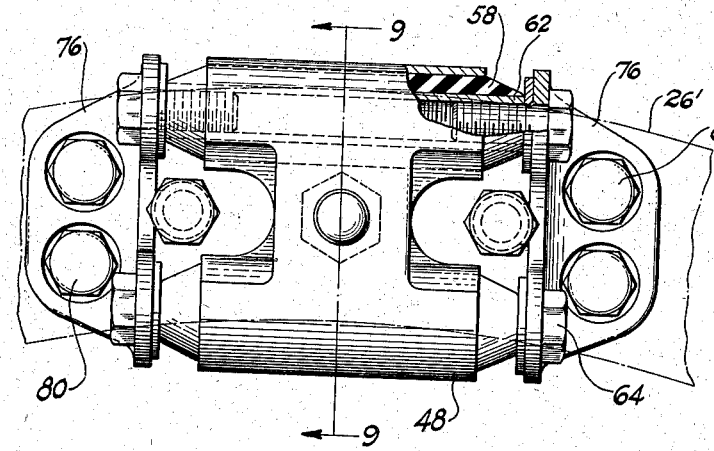
Figure 9:
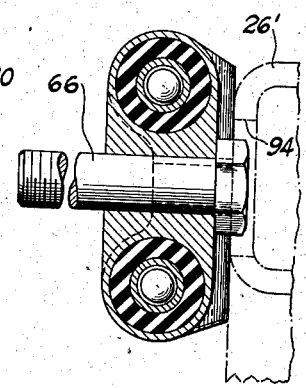
Figure 10:
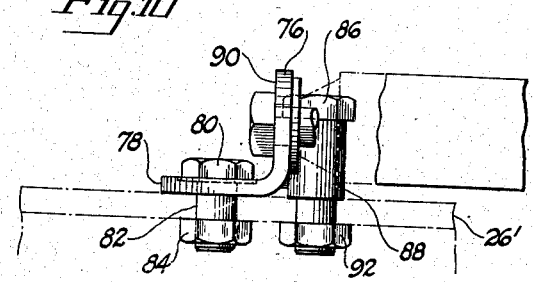

In the drawings, Fig. 1 is a side elevational view of an engine attached to an engine supporting ring, a portion of the ring being broken away to illustrate the application thereto of an engine mount constructed according to the idea of this invention. Figure 2 is a front elevational view on an enlarged scale of a resilient engine mount constructed according to the idea of the invention. Fig. 3 is an elevational view of a fragmentary portion of the rear side of the engine and the engine supporting structure showing engine mounts constructed according to the idea of this invention installed between the engine and the engine supporting ring. Fig. 4 is an elevational view on an enlarged scale similar to Fig. 2 showing a somewhat modified form of engine mount, a portion being broken away to better illustrate the construction thereof. Fig. 5 is a cross sectional view on the line 5—5 of Fig. 4. Fig. 6 is a detail view, partly in section, of the engine mounting block illustrated in Fig. 2. Fig. 7 is an end elevational view of the mounting block illustrated in Fig. 6. Fig. 8 is a front elevational view showing a mounting block as illustrated in Fig. 2, and 6, mounted upon an engine supporting ring having a channel shaped cross section. Fig. 9 is a vertical sectional view on the line 9—9 of Fig. 8, and Fig. 10 is a fragmentary plan view of the engine mount illustrated in Fig. 8.

Referring to the drawings in detail, the numeral 12 generally indicates an engine which may be a radial internal combustion engine of the type commonly employed for the propulsion of airplanes. This engine is provided with a propeller hub 14 and a propeller, not illustrated, of conventional design, and has a plurality of cylinders as indicated at 16 mounted upon the crankcase 18. Attached to the crankcase is an intake manifold 20 commonly formed as a casting of some light strong alloy such as aluminum alloy and provided with integral engine mounting pads 22. Referring to Fig. 3 it will be observed that the engine mountings pads 22 are in the form of cylindrical bosses cast on the manifold structure and provided with concentric bores or wells 24 which may be internally screw threaded for the reception of stud bolts by means of which the engine is mounted upon the supporting structure. The pads 22 are spaced around a circle having its center substantially coincident with the axis of rotation of the engine crankshaft and are substantially equally spaced from each other. The engine is supported upon an engine mounting ring which may be tubular in cross section as indicated at 26 in Figs. 1, 3, and 5, or may have some other cross sectional form such as a channel section as indicated at 26' in Figs. 8 and 9. The ring 26 is mounted upon the framework of the vehicle by means of a plurality of braces as indicated at 28 which are preferably permanently welded to the engine mounting ring and provided with apertured brackets 30 by means of which the engine mounting ring 26 may be detachably secured to the framework of the airplane. The engine is conventionally secured to the engine mounting ring by means of apertured metallic mounting brackets welded to the ring and positioned so as to overlap the engine mounting pads when the engine and ring are in the relative position illustrated in Fig. 1, and stud bolts extending through the apertures in the brackets and into the screw threaded wells 24 in the engine mounting pads. While this construction provides a secure and solid attachment of the engine to the supporting structure, it, at the same time, transmits most of the engine vibration to the frame of the airplane. As stated above, it is among the objects of this invention to provide a mounting which will permanently and safely secure the engine to the engine supporting structure and will at the same time reduce the amount of vibration transmitted from the engine to the supporting structure. This and other objects are accomplished by the following construction.

A plurality of engine carrying brackets are secured to the mounting ring 26 and, in the form of the invention illustrated in Figs. 1 to 5, these brackets are formed by welding to the inner surface of the ring 26, a plurality of bracket hangers as indicated at 32 and 34, arranged in pairs and provided with parallel faces 36, spaced from each other so as to include between them a space equal to or greater than the width of the corresponding engine mounting pad 22. The hangers 32 and 34 extend inwardly of the mounting ring 26 and lie substantially completely in the space included by the ring. The pairs of hangers are disposed around the mounting ring in spaced relation corresponding to the space of the engine mounting pads 22 so that each cooperating pair of hangers 32 and 34 forms a mounting bracket for attachment of one of the mounting pads 22. The hangers 32 and 34 may take any desired form which will provide sufficient structural strength for carrying the load imposed upon them, but I prefer to form these hangers as substantially U-shaped or channel members, each having a web, comprising the face 36, of a width substantially equal to the diameter of the mounting ring and a pair of tapered flanges as indicated at 38 and 40, disposed one at each side of the web; the entire member being formed by stamping and bending up a suitable piece of sheet metal. The end of the web to which the wide ends of the tapered flanges are attached is preferably cut out to provide therein a concavity having a radius equal to the radius of the exterior surface of the mounting ring so that the hanger may be closely fitted to the under surface of the ring. The hangers are preferably attached to the ring by welding along the end of the web contacting the ring and along the wide ends of the flanges as indicated at 42. Each of the hangers 32 and 34 is provided in the web portion thereof with a pair of apertures as indicated at 44 and 46, these apertures being spaced from each other along a radius of the mounting ring 26 and the opposite apertures in each pair of hangers being in alignment with each other.

A mounting block generally indicated at 48 is attached to each of the mounting pads 22 as is clearly illustrated in Fig. 3. In what is now considered to be the preferred form of the invention, these mounting blocks are formed as dropforgings and then machined to the proper shape and dimensions. Each block consists essentially of a pair of sleeve members 50 and 52 in the form of elongated cylinders of constant diameter spaced apart and having their axes parallel to each other. The sleeves 50 and 52 are joined together by an integral intermediate portion 54 having an aperture 56 extending therethrough in an axial direction disposed at right angles to the axes of the sleeve members 50 and 52, for the reception therethrough of a stud bolt 66 for securing the mounting block to a mounting pad of the engine. As illustrated in Figs. 7 and 9, the block 48 has a thickness substantially equal to the outer diameter of the sleeve portions 50 and 52 and preferably has a width somewhat less than the length of the sleeves 50 and 52 in order to reduce the weight of the block. A resilient tubular bushing 58, preferably formed of vulcanized rubber or a similar material, is disposed within each of the sleeve members 50 and 52 and has tapered ends extending beyond the associated sleeve member as indicated at 60. Within each of the bushings 58 there is a tubular inner member 62 which extends entirely through the bushing and terminates flush with the tapered ends of the bushing. This tubular member is preferably internally screw threaded in the opposite ends thereof to receive stud bolts 64 which pass through the apertures 44 and 46 provided in the webs 36 of the bracket hangers and are screw threaded into the inner members to rigidly secure the inner members to the ring carried brackets. A bolt 66 extends through each of the apertures 56 and into the bore or well 24 provided in the corresponding engine mounting pad 22, to rigidly secure the mounting blocks 48 to the engine pads.

When the bolts 64 and 66 are in place, as described above, the engine is securely, but resiliently, supported upon the engine mounting ring 26 by the mounting blocks 48 resiliently supported upon the brackets provided by the paired hangers 32 and 34 by means of the inner members 62, the connecting bolts 64, and the resilient bushings 58 interposed between the inner members and the sleeve portions of the mounting blocks. The hangers 32 and 34 have their parallel surfaces 36 spaced apart a distance equal to the length of bushings 58 and somewhat greater than the length of the sleeve portions 50 and 52 of the mounting blocks, thereby allowing for slight movements of the mounting blocks 30 relative to the brackets by placing the material of the resilient bushings 58 in shear in an axial direction.

From the above description it will be observed that any load placed upon the mounting blocks 48 in a direction parallel to a radius of the mounting ring, or which tends to rotate the mounting blocks about the axes of their respective inner members 62, is resisted by the spaced apart inner members 62 so that such loading results only in radial compression of the resilient bushings and relieves the resilient bushings of any rotational shear. Loading in a direction tangential to the mounting ring, however, such as the loading due to the torque forces exerted by the engine, places the resilient bushings in axial shear and any torque vibrations set up by the engine are dampened by the resiliency of the bushings under axial shear. The resilient bushings 58 are preferably bonded during the vulcanizing process to both the inner members 62 and the sleeve portions 50 and 52 of the mounting blocks 48 with the result that the resiliency of the bushing will always return the mountings to their normal centered position relative to the mounting brackets as illustrated in Fig. 2.

In the modified form of the invention illustrated in Figs. 4 and 5, the sleeves 50' and 52' are formed as separate tubular members and are secured together in spaced parallel relation to each other by an intermediate member 54' welded along its adjoining edges to the sleeve members. The member 54' is preferably in the form of a spool of square cross section, as indicated at 68, provided at each end with an outwardly extending flange as indicated at 70 and 72, the edges of the flanges 70 and 72 contacting the cylindrical members 50' and 52' and being securely welded thereto as indicated at 74. The intermediate member 54' is also provided with a centrally located aperture 56' for the reception of the bolt 66 for securing the mounting block to the engine. The resilient bushings 58 and inner members 62 in this modified form of the device are the same as those used in the preferred form of the device as described above.

In the further modified form of the device illustrated in Figs. 8, 9 and 10, the resilient mountings are secured upon a ring 26' having a flat face opposed to the end of mounting pads 22, the diameter of the ring being substantially the same as the diameter of the circle around which the mounting pads are arranged. While the ring 26' may be solid or of a square or oblong cross section, as illustrated in Fig. 9, it has a channel cross section comprising a pair of flanges and an intermediate web. In this form of the device the ring carried brackets are formed by mounting pairs of angle plates, as indicated at 76, directly upon the flat surface of the web of the ring. Each of the angle plates 76 has an apertured base portion 78 through which bolts 80 extend, the mounting ring 26' being provided with corresponding apertures 82 for the reception of the bolts and the bolts being provided with screw threaded nuts 84 on the side of the mounting ring opposite the plate. In the construction illustrated, the two bolts 80 extend through the base portion 78 of the angle plate, and a third, somewhat longer bolt, 86, extends through a tubular sleeve 88, securely welded to the upstanding portion 90 of the angle plate on the side thereof opposite the base portion 78 and through the mounting ring 26 where it is secured by means of a screw threaded nut 92. The upstanding portion 90 of each angle plate is provided with a pair of spaced apertures through which extend the bolts 64 for securing the inner members 62 to the plates, the opposite apertures in the plates of each pair being in axial alignment as described above. The inner members 62, the resilient bushings 58, and the mounting blocks 48, are the same as those described above, as either form of my improved mounting block may be used in combination with the angle plates 76 and the blocks are secured to the engine mounting pads in the manner as described above by means of the bolts 66.

Preferably the mounting ring 26' is provided with a series of apertures as indicated at 94, disposed in concentric relation with the heads of the bolts 66 so that a tool may be inserted through these apertures to engage the heads of the bolts 66 to turn the bolts into rigid engagement in the mounting pads 22.

While I have illustrated and described a specific mechanical embodiment of the idea of invention, it is to be understood that the invention is not limited to the specific construction so illustrated and described, but that such changes in size, shape, and arrangement of parts may be resorted to as come within the scope of the sub-joined claims.

Having now described my invention so that others skilled in the art may clearly understand the same, what I desire to secure by Letters Patent is as follows:

1. A resilient mounting for supporting an engine having mounting pads thereon on a frame having an engine mounting ring comprising, pairs of hangers adapted to be secured in spaced parallel relation on said ring to form engine mounting brackets, mounting blocks each comprising a forging provided with a pair of spaced parallel sleeves and a centrally located aperture extending therethrough to receive a bolt for securing said mounting block to one of said mounting pads, a member extending through each of said sleeves and secured to the hangers of the respective brackets receiving said blocks, and a resilient bushing in each of said sleeves surrounding the respective member.

2. A resilient mounting for supporting an engine having apertured mounting pads thereon on a frame having an engine mounting ring comprising, hangers for attachment in spaced parallel relation to said ring to form engine mounting brackets, mounting blocks each comprising a pair of tubular members disposed in spaced parallel relation to each other and an apertured intermediate member connecting said tubular members and permanently secured thereto, a bolt extending through each apertured intermediate member and into said aperture in said mounting pad to rigidly secure said mounting block to said mounting pad, a member extending through each tubular member of each block and secured to the hangers of the corresponding brackets, and a resilient bushing in each of said tubular members surrounding the respective inner member.

3. A resilient mounting for supporting an engine having apertured mounting pads thereon on a frame having an engine mounting ring comprising, hangers for attachment in pairs to said ring, each hanger having a web arranged to extend substantially parallel to a radius of said ring and provided with a pair of apertures spaced from each other along said radius, and a tapered flange at each edge of said web for reinforcing said web, the webs of each pair of hangers being disposed in spaced parallel relation to each other, mounting blocks each having an apertured intermediate portion connecting a pair of spaced parallel sleeves with said aperture substantially equidistant from said sleeves for attachment to the mounting pad of said engine and disposed between the hangers of corresponding pairs with said sleeves in axial alignment with said apertures, a member extending through each of said sleeves, a bolt extending through each of said apertures and screw threaded into the corresponding end of the respective member for securing said members to said hangers, a resilient bushing in each sleeve surrounding the respective member, and a bolt extending through each apertured intermediate portion to the respective engine mounting pad.

4. A resilient mounting for supporting an engine having spaced mounting pads arranged in a circle upon one side thereof on a frame having a tubular engine mounting ring comprising, a series of hangers adapted to be secured in pairs to the inner side of said ring and to extend within said ring to form mounting brackets for said engine, the hangers of each pair being provided with webs for disposition parallel to the axis of said ring, and tapered flanges for reinforcing said webs, mounting blocks each having a pair of parallel sleeves and a substantially centrally apertured portion intermediate said sleeves secured one to each engine mounting pad and disposed between the parallel webs of the hangers of the corresponding bracket, a resilient bushing in each sleeve, an inner member extending through each bushing, and means extending through the respective webs for securing said inner members to the respective brackets.

5. In combination with an engine having spaced mounting pads and a frame having an engine mounting ring, means for resiliently supporting said engine on said ring comprising, a series of angle plates secured to said ring adjacent to said engine and arranged in pairs to provide a series of ring carried mounting brackets for said engine, an engine mounting block having a pair of parallel sleeves and an apertured intermediate portion connecting said sleeves, a bolt extending through said apertured intermediate portion of each block spaced midway between said sleeves and through the corresponding mounting pad for securing a mounting block to each of said mounting pads, a resilient bushing in each of said sleeves, an inner member extending through each bushing, and means securing said inner members to said angle plates.

6. An engine mounting for securing an engine to a ring support comprising; a series of rubber bushings extending in sequence in two concentric circles around said ring and having their axes tangential with said circles, means centered upon said circles for attaching said bushings to said ring support and means centered between said circles for attaching said bushings to said engine to subject said bushings to shear strain under the torque of said engine and to radial compression only under the weight and thrust of said engine.

7. An engine mounting comprising in combination, an engine mounting block having spaced parallel sleeves, means symmetrically located between said sleeves for connecting said block with said engine, and means for connecting said block with an engine support, said support connecting means comprising, a member positioned within each of said sleeves, a resilient bushing between each member and its surrounding sleeve and means for securing each member to said support.

8. An engine mounting block comprising in combination a block having a substantially central aperture for receiving means connecting the block with an engine, a pair of spaced parallel sleeves arranged on opposite sides of said central aperture and having their axes arranged transverse to the axis of said aperture, resilient bushings in said sleeves and means connecting said bushings with a support for said engine.

9. In an engine mounting for securing an engine to a mounting ring, in combination a block, means located at substantially the center of said block for connecting said block with said engine or said ring, and means located on opposite sides of said first mentioned means for connecting said block with said ring or said engine, said second mentioned means comprising a pair of spaced parallel sleeves integral with and forming part of said block, a resilient bushing arranged in each of said sleeves, and means connecting said bushings with said support.

SERGE GLUHAREFF.